United States Patent [19]

Grenier

[11] 4,231,542

[45] Nov. 4, 1980

[54] AUTOMATICALLY RESETTING FLUSH VALVE

[75] Inventor: Wilfred J. Grenier, Rutland, Mass.

[73] Assignee: General Industries, Inc., Rutland, Mass.

[21] Appl. No.: 932,299

[22] Filed: Aug. 9, 1978

[51] Int. Cl.³ .................... F16K 21/04; F16K 31/385
[52] U.S. Cl. ......................................... 251/15; 251/32; 251/45
[58] Field of Search ........................ 251/15, 19, 32, 34, 251/45, 16, 17, 18

[56] References Cited

U.S. PATENT DOCUMENTS

| | | | |
|---|---|---|---|
| 2,298,233 | 10/1942 | Ricard | 251/32 |
| 3,674,237 | 7/1972 | Heyer et al. | 251/32 |

*Primary Examiner*—Arnold Rosenthal
*Attorney, Agent, or Firm*—Joseph S. Iandiorio

[57] ABSTRACT

In a flush valve having a housing, a moveable partition sealing engaging the housing, and defining a primary chamber and a control chamber; an inlet port in the primary chamber and an outlet port in the primary chamber; and a valve element connected with the partition for closing the inlet port and the outlet port; the improvement including: an actuator mechanism including an actuator valve connected with the control chamber; an actuator member for setting the actuator valve in the open position to vent the control chamber and enable the valve element to move away from the outlet port and open the flush valve; and an automatic release member moveable with the actuator member for setting the actuator valve to the open position and moveable independently of the actuator member to reset the actuator valve in the closed position; and an actuator control mechanism driven by the partition as the valve element moves away from the outlet port for driving the automatic release member to reset the actuator valve to the closed position and cease venting the control chamber.

3 Claims, 6 Drawing Figures

AUTOMATICALLY RESETTING FLUSH VALVE

FIELD OF THE INVENTION

This invention relates to an automatically resettable flush valve.

BACKGROUND OF THE INVENTION

In certain types of conventional flush valves, the actuator member or handle, when operated by the user, acts on an actuator or control valve to be opened so that an actuator or control chamber, which previously was pressurized to maintain the main valve closed, is vented. Consequently, upon the venting of the control chamber, the force seeking to maintain the main valve closed is diminished so that the main valve can open and start the flushing action. As long as the actuator handle is operated so as to act on the actuator or control valve, the flushing action will continue. This has caused a good deal of difficulty in the past, for malfunctioning or sticky actuator handles, as well as indifferent, careless or mischievous people, may cause the actuator handle to remain in the position so that the flushing action continues indefinitely. This results in an overloading of the associated drainage system, and, especially in cases where more than one such flush valve continues to flush, can result in flooding and consequent serious damage to the premises.

SUMMARY OF THE INVENTION

It is therefore an object of this invention to provide an improved, simplified, inexpensive, and effective automatic release device for independently resetting a valve to the closed position, independent of continued operation of the valve actuator.

It is a further object of this invention to provide an automatically resettable flush valve.

This invention may be used in a flush valve having a housing and a movable partition sealingly engaging the housing, and defining a primary chamber and a control chamber. There is an inlet port and an outlet port in the primary chamber. A valve element is connected with the partition for closing the outlet port.

The invention features an actuator mechanism including an actuator valve connected with the control chamber. An actuator member sets the actuator valve to the open position to vent the control chamber and enables the valve element to move away from the outlet port and open the flush valve. There is an automatic release member moveable with the actuator member for setting the actuator valve to the open position. The automatic release member is movable independently of the actuator member to reset the actuator valve to the closed position. An actuator control mechanism driven by the partition as the valve element moves away from the outlet port enables the automatic release member to reset the actuator valve to the closed position and cease venting the control chamber.

In preferred embodiments, the actuator mechanism may include first biasing means for urging the automatic release member, and second biasing means for urging the actuator member, both toward the actuator valve closed position. The actuator control mechanism may include a keying reset member for provisionally fixing together the actuator member and the automatic release member during the operation of the actuator mechanism, to move the actuator valve into the open position.

The actuator control mechanism may also include third biasing means and a locking member for holding the actuator valve and automatic release member in the open position. The keying reset member is responsive to the partition for disengaging the locking member as the valve element moves away from the outlet port.

DISCLOSURE OF PREFERRED EMBODIMENT

Other objects, features and advantages will occur from the following description of a preferred embodiment and the accompanying drawings, in which.

Figure 1:
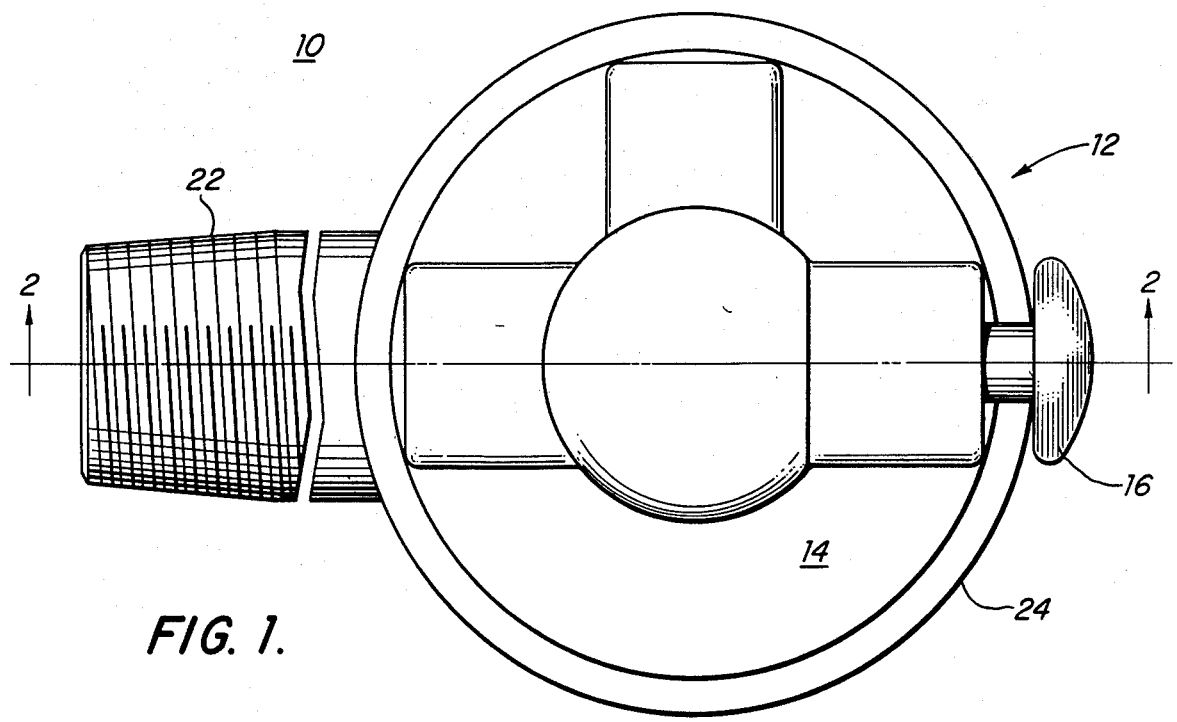
FIG. 1 is a plan view of a flush valve according to this invention.
Figure 2:
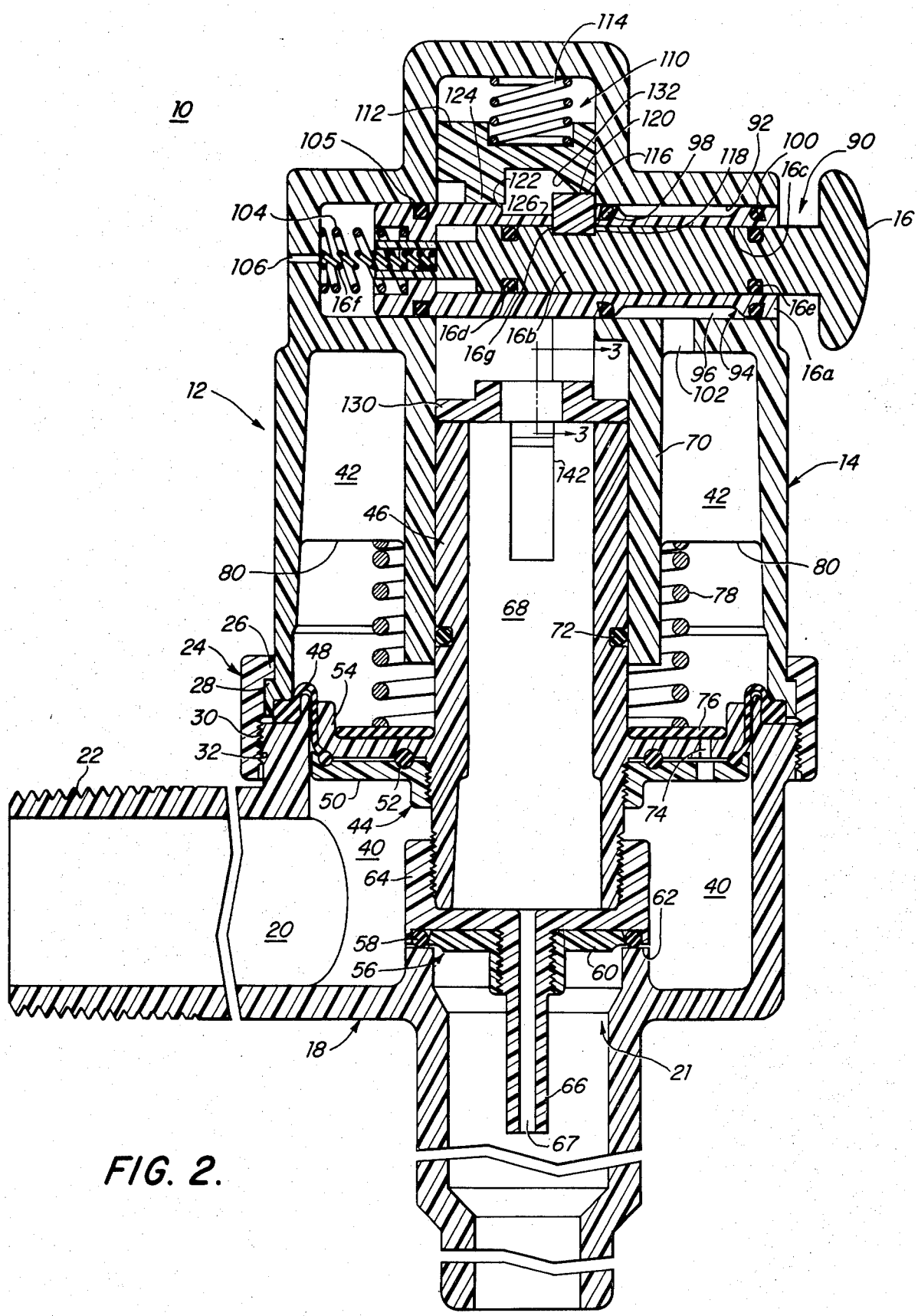
FIG. 2 is a sectional view taken along lines 2—2 of FIG. 1.

There is shown in FIG. 1 a flush valve 10 according to this invention including a housing 12, including an upper part or cap 14 which contains the actuator member or handle 16, and a lower part or base 18, FIG. 2, which contains an inlet port 20 with a threaded lateral inlet extension 22 and outlet port 21. Cap 14 and base 18 are locked together by a threaded locking ring 24. Locking ring 24 has a locking portion 26 which engages a locking lip 28 on cap 12 and threads 30, which engage threads 32, on base 18. When locking ring 24 is loosened, cap 14 and base 18 may be relatively rotated to arrange actuator handle 16 and inlet extension 22 to any relative azimuthal orientation, as required by a particular installation. The cap and base will then be held in this orientation by the securing of locking ring 24.

Housng 12 is separated into two main chambers, primary chamber 40 and control chamber 42, by partition 44. Partition 44 includes hollow slide member 46, rolling diaphragm 48, which slidably, sealingly supports slide 46 with respect to housing 12, and a diaphragm locking plate 50, which threadably engages slide 46 and compresses the inner end of diaphragm 48 and "O" ring 52 against flange 54 of slide 46. The other end of diaphragm 48 is gripped between cap 14 and base 18 by means of locking ring 24. At its lower end partition 44 includes a valve element 56 including "O" ring 58 and "O" ring locking plate 60, which holds "O" ring 58 in the proper position for contacting the seat 62 of outlet port 21. Outlet port valve element 56 is carried by flow regulator member 64, which is threadably engaged with the lower end of slide member 46 and includes a depending tubular extension 66 which threadably engages with locking plate 60 and contains duct 67 which connects auxiliary chamber 68 formed within slide 46 with outlet port 21, and which functions as a flow regulating outlet. Slide 46 is slidable in guide 70, which is a portion of cap 14, and is sealingly engaged with guide 70 by means of "O" ring 72.

Passage or hole 74 in flange 54 of slide 46 and plate 50 interconnects primary chamber 40 and control chamber 42 and enables equalization of pressure therebetween. A unilateral valve member, resilient washer 76, covers the end of hole 74 in control chamber 42, and is urged in the direction to close hole 74 by a biasing member, spring 78, which contacts webs 80 of cap 14 and also acts to urge slide 46 downward and to keep valve element 56 closed on outlet port 21.

Actuator handle 16 forms a portion of actuator mechanism 90, which is slidably housed in bore 92 of cap 14. Actuator mechanism 90 also includes cylinder 16a and an actuator valve 94 formed by recess 96 between "O" ring seals 98 and 100. Actuator valve 94 vents control chamber 42 through port 102 into auxiliary chamber 68 when actuator handle 16 is pressed inwardly, to the left in FIG. 2. Actuator mechanism 90 also includes biasing means, spring 104, which urges handle 16 to the right and actuator valve 94 to the closed position. A breather hole 106 is provided in cap 14 to prevent excessive back pressure from building up as a result of the sealing function of "O" ring 105 when actuator handle 16 is moved inwardly.

Actuator control mechanism 110 includes locking member 112 which is biased downwardly by means of spring 114, and reset member 116, which is received in recess 118 in actuator handle 16.

Figure 3:
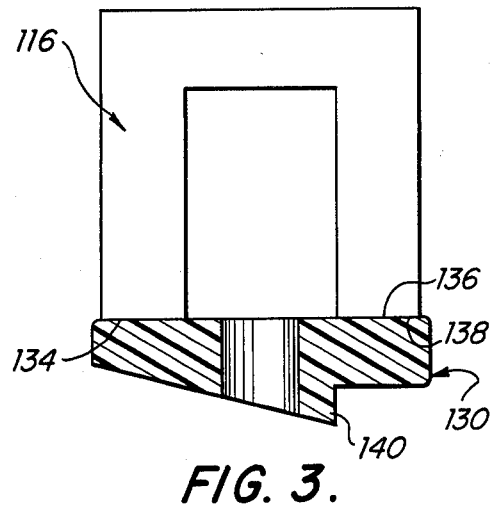
FIG. 3 is a sectional view of a follower member driven with the partition and a reset member resting on the follower member.
Figure 4:
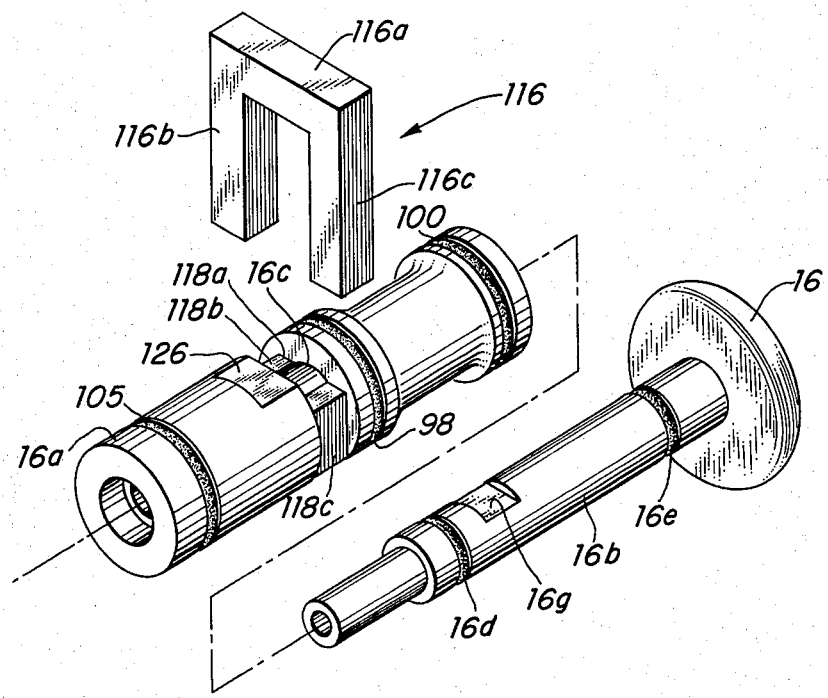
FIG. 4 is an axonometric view of a portion of the actuator mechanism and actuator control mechanism.
Figure 5:
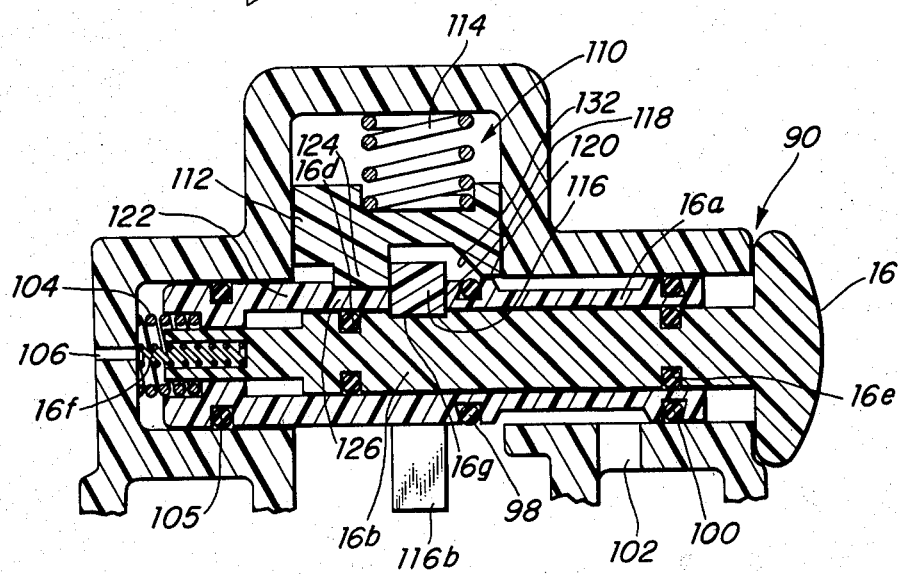
FIG. 5 is a sectional view of parts of the actuator control mechanism and actuator mechanism upon actuation of the valve.

Reset member 116 slides along the top surface of follower member 130 when actuator handle 16 moves left and right, FIG. 3; reset member 116 has its lower ends 134 and 136 resting on the upper surface 138 of follower member 130. The lower extension 140 of follower member 130 fits in slot 142, FIG. 2, of slide 46. Reset member 116 includes a top portion 116a and two legs 116b, 116c, FIG. 4, which are received in top channel 118a and side channels 118b, 118c, respectively, of recess 118 in cylinder 16a. Thus member 116 is retained by channels 118b, c to move with cylinder 16a even when member 116 is driven upward and portion 116a is clear of channel 118a.

When actuator handle 16 is moved to the left to open actuator valve 94 and vent control chamber 42 through port 102 into auxiliary chamber 68, reset member 116 moves out from under portion 120 of locking member 112, and shoulder 122 moves to the left, clear of detent 124 which, under the urging of spring 114, is pressed into recess 126, where it abuts against shoulder 122. Thus actuator handle 16 and cylinder 16a are locked in that position with actuator valve 94 in the open position. When sequently partition 44 moves upwardly, moving valve element 56 to open outlet port 21, the upper end of slide 46, either directly, or indirectly through an intermediate member such as follower member 130, contacts the lower end of reset member 116 and moves it upwardly; this drives locking member 112 upwardly against the force exerted by spring 114, lifting detent 124 out of recess 126, clear of shoulder 122, thereby permitting actuator handle 16 to return to the normal position with actuator valve 94 in the closed position.

This movement produced by the retraction of detent 124 is sufficient for "O" ring 98 to reestablish a seal with bore 92 and close actuator valve 94. Subsequently, when the outlet port is closed by valve element 56 as partition 44 descends, reset member 116 is permitted to drop, as a result of the descent of follower member 130 and/or slide 46, so that reset member 116 gradually moves down along inclined surface 132 of locking member 112 unit it resumes it initial position as shown in FIG. 2.

Initially, an inlet line connected to inlet extension 22 provides flushing fluid such as water at inlet port 20. This water moves through hole 74, pushing resilient washer 76 out of the way and entering chamber 42. Finally, when control chamber 42 is full, the pressure, plus the urging of spring 78 on washer 76, seals hole 74 so that further transfer at the present inlet pressure of water between primary chamber 40 and control chamber 42 is not possible. In this condition flush valve 10 is fully operational and awaiting actuation. The pressure in control chamber 42 urges partition 44 downward so that "O" ring 58 seals against seat 62 to close outlet port 21. In this condition, a sudden occurring at inlet extension connection 22 produces a negative pressure in hole 74 with respect to the pressure in control chamber 42 so that washer 76, performing as a unidirectional valve, is caused to even more tightly seal hole 74 and even more strongly force "O" ring seal 58 against seat 62 to more securely close the outlet port 21 and prevent any siphoning effect which might draw water from the water closet up through the outlet port 21 and back into the supply line connected at inlet extension 22. Thus flush valve 10 includes as an integral part an anti-siphon feature which seals the outlet port even more strongly when the line pressure decreases or virtually disappears.

The unidirectional valve constituted by resilient washer 76 also performs a second function: it acts as an anti-surge valve to prevent sudden increases in pressure from accidentally, unwantedly actuating flush valve 10. Surges occur when the pressure at inlet port 20 is reestablished following a siphoning condition or when normal pressure in the line is suddenly exceeded by a sudden surge of increased pressure. In either case, the sudden increase of pressure is communicated immediately, directly through hole 74, where it pushes resilient washer 76 out of the way and enters control chamber 42, increases the pressure that is pressing downward on partition 44, and provides increased sealing force for valve element 56 at outlet port 21. Thus upon the appearance of this excess pressure or surge the valve is only closed more tightly, and upon its disappearance the increased pressure now stored in control chamber 42 continues the increased sealing pressure, which keeps closed outlet port 21.

In operation, the user presses actuator handle 16 with cylinder 16a inwardly against the forces of springs 104 and 16c only, and does not need to oppose line pressure or any substantial component of line pressure. Upon actuator handle 16 and cylinder 16a being moved inwardly, to the left in FIG. 2, actuator valve 94 is opened so that control chamber 42 vents through port 102 into auxiliary chamber 68. At this point shoulder 122 has cleared detent 124 and detent 124 has descended and is holding actuator handle 16 and cylinder 16a in the actuated position, whereby actuator valve 94 is in the open position. The venting of the water in control chamber 42 into auxiliary chamber 68 decreases the pressure on partition 44 and permits the line pressure in primary chamber 40 to move partition 44 upwardly. This movement moves reset member 116 upwardly and drives locking member 112 upwardly against the force exerted by spring 114, lifting detent 124 out of recess 126 and clear of shoulder 122, FIG. 6. Springs 104 and 16f now handle 16 and cylinder 16a with member 116 to the right.

As partition 44 moves upwardly, valve element 56 moves off seat 62 and the flow begins from inlet port 20 to outlet port 21, instituting the flushing action. The height to which partition 44 rises, and thus the size of the opening which is provided between valve element 56 and outlet port 21, is in part controlled by duct 67, which restricts the flow of water from auxiliary chamber 68 and thereby limits somewhat the height to which partition 44 rises and the extent to which port 21 is opened by the movement of partition 44. As the flushing action continues, water from primary chamber 40 is driven through hole 74, past resilient washer 76 into control chamber 42, which is now at much lower pressure. As control chamber 42 begins to fill and the downward force on partition 44 increases, partition 44 begins to move downwardly, restricting to an even greater degree the opening between valve element 56 and outlet port 21 and permitting follower 130 to drop down with slide 46 and re-assume their initial positions. As follower 130 drops member 116 is urged to drop by member 112 under force of spring 114. The force of springs 104 and 114 urge member 116 to the right and down, respectively. The upper right hand corner of member 116 slides down along surface 132. Finally, valve element 56 closes outlet port 21, control chamber 42 once again has its pressure equalized with that of primary chamber 40, actuator handle 16 is in its normal position, as shown in FIG. 2, and flush valve 10 is once again ready for operation.

In accordance with this invention, actuator mechanism 90 includes an automatic release member, locking cylinder 16a, FIG. 2, which is intimately combined with and forms a part of actuator member 16. Cylinder 16a is normally keyed at recess 16g to move as a unit with actuator member or handle 16, by means of top porton 116a of reset member 116. The stem 16b of actuator member or handle 16 is sealingly engaged with the inner bore 16c of cylinder 16a by means of "O" rings 16d and 16e. While spring 104 urges cylinder 16a to the right, to the closed position of actuator valve 94, an additional spring 16f independently urges stem 16b to the right.

Thus in operation, when actuator member or handle 16, stem 16b, is pushed in it moves to the left, carrying with it locking cylinder 16a. With stem 16b and cylinder 16a fully inserted in bore 92, detent 124 drops into recess 126 and locks them in position, holding actuator valve 94 in open position so that control chamber 42 can fully vent into auxiliary chamber 68. Subsequently, when partition 44 begins to rise, reset member 116 also rises, driving locking member 112 upwardly against the force of spring 114 and lifting detent 124 out of recess 126 clear of shoulder 122. Simultaneously, reset member 116 clears recess 16g so that reset member 116 no longer keys cylinder 16a to actuator handle 16.

Figure 6:
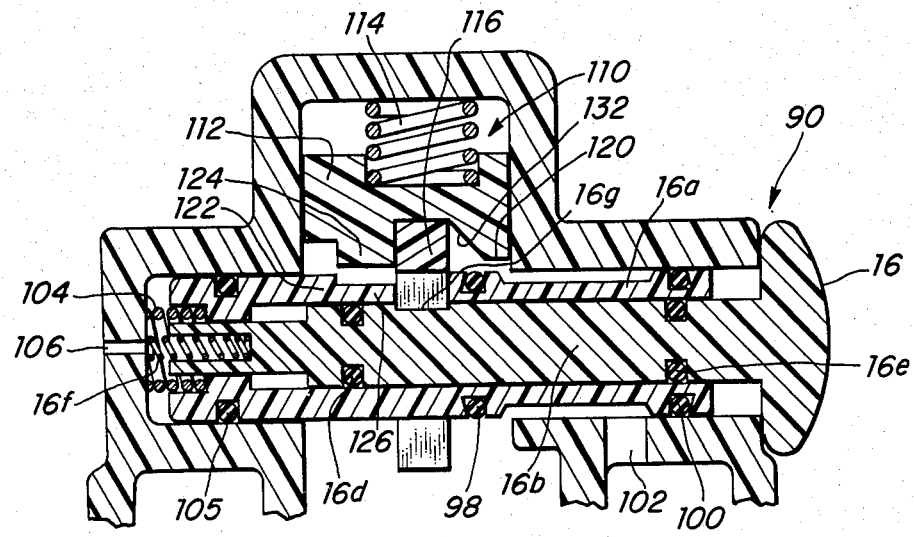
FIG. 6 is a sectional view similar to FIG. 5 after opening of the valve as the actuator mechanism begins to rest.

Therefore, even though actuator handle 16 may be fully depressed as in FIG. 6, by a mischievous person, locking cylinder 16a is free to move back to te right and close actuator valve 94. This enables flush valve 10 to complete its natural cycle of operation: partition 14 descends; valve element 56 closes outlet port 21; control chamber 42 is repressurized; and reset member 116 is enabled to descend along with partition 44 and reseats itself in recess 118, as soon as actuator handle 16 has been released and driven to the normal position by spring 16f independently of whether or not stem 16b is held in.

Other embodiments will occur to those skilled in the art and are within the following claims:

What is claimed is:

1. In a flush valve having a housing, a moveable partition sealingly engaging the housing and defining a primary chamber and a control chamber, an inlet port in the primary chamber and an outlet port in the primary chamber, and a valve element connected with the partition for closing the outlet port, the improvement comprising:

an actuator mechanism including an actuator valve connected with said control chamber; an actuator member for setting said actuator valve to the open position to vent said control chamber and enable said valve element to move away from said outlet port and open said flush valve; and an automatic release member moveable with said actuator member for setting said actuator valve to the open position and moveable independently of said actuator member to reset said actuator valve to the closed position; and an actuator control mechanism driven by said partition as said valve element moves away from said outlet port, enables said automatic release member to reset said actuator valve to the closed position and cease venting said control chamber.

2. The flush valve of claim 1 in which said actuator mechanism includes first biasing means for urging said automatic release member, and second biasing means for urging said actuator control member, both towards the actuator valve closed position; and said actuator control mechanism includes a keying reset member for provisionally fixing together said actuator member and said automatic release member during operation of said actuator mechanism to move said actuator valve to the open position.

3. The flush valve of claim 2 in which said actuator control mechanism includes third biasing means and a locking member for holding said actuator valve and automatic release member in the open position; said keying reset member being responsive to motion of said partiton for disengaging said locking member as said valve element moves away from said outlet port.

* * * * *